US008041745B2

(12) United States Patent
Newton et al.

(10) Patent No.: US 8,041,745 B2
(45) Date of Patent: Oct. 18, 2011

(54) METHODS FOR MANAGING AGGREGATED ADDRESS BOOKS

(75) Inventors: Gregory Newton, Dunwoody, GA (US); John Ruckart, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 323 days.

(21) Appl. No.: 11/321,665

(22) Filed: Dec. 29, 2005

(65) Prior Publication Data

US 2007/0061330 A1 Mar. 15, 2007

Related U.S. Application Data

(60) Provisional application No. 60/717,222, filed on Sep. 15, 2005.

(51) Int. Cl.
*G06F 17/30* (2006.01)
*G06F 15/18* (2006.01)
(52) U.S. Cl. .......................................... 707/802; 706/25
(58) Field of Classification Search .................. None
See application file for complete search history.

(56) References Cited

U.S. PATENT DOCUMENTS

| | | | | |
|---|---|---|---|---|
| 6,895,084 | B1 * | 5/2005 | Saylor et al. | 379/88.22 |
| 6,917,610 | B1 * | 7/2005 | Kung et al. | 370/352 |
| 6,956,942 | B2 * | 10/2005 | McKinzie et al. | 379/355.04 |
| 7,120,455 | B1 * | 10/2006 | Chen et al. | 455/466 |
| 2003/0206619 | A1 * | 11/2003 | Curbow et al. | 379/210.01 |
| 2004/0052356 | A1 * | 3/2004 | McKinzie et al. | 379/355.02 |
| 2004/0268265 | A1 * | 12/2004 | Berger | 715/752 |
| 2005/0181775 | A1 * | 8/2005 | Rideout et al. | 455/414.3 |
| 2005/0193345 | A1 * | 9/2005 | Klassen et al. | 715/751 |
| 2005/0203757 | A1 * | 9/2005 | Lei et al. | 705/1 |
| 2005/0243993 | A1 * | 11/2005 | McKinzie et al. | 379/355.04 |
| 2006/0026288 | A1 * | 2/2006 | Acharya et al. | 709/227 |
| 2006/0140200 | A1 * | 6/2006 | Black et al. | 370/401 |
| 2006/0271696 | A1 * | 11/2006 | Chen et al. | 709/229 |
| 2006/0281490 | A1 * | 12/2006 | Dolgas et al. | 455/556.2 |
| 2008/0008105 | A1 * | 1/2008 | Black et al. | 370/260 |
| 2008/0045186 | A1 * | 2/2008 | Black et al. | 455/413 |
| 2010/0235358 | A1 * | 9/2010 | Wong | 707/740 |

OTHER PUBLICATIONS

Toporek, Chuck, "A User's Guide to Mac OS X, Pocket Guide," No date, pp. 9-17.
"Oracle Collaboration Suite Connector for Outlook 10g Overview," Aug. 2005, pp. 1-4.
"Good Contacts: How it Works," http://www.goodcontacts.com/products/how.php, 2005, 2 pages.

(Continued)

*Primary Examiner* — Tarek Chbouki
(74) *Attorney, Agent, or Firm* — Myers Bigel Sibley & Sajovec (57) ABSTRACT

Methods of managing data associated with an entity include providing an address book entry for the entity in an address book of a user. The address book entry has an associated name and includes a plurality of identifications associated with the entity. Data records associated with the entity are automatically obtained from a plurality of applications based on the plurality of identifications associated with the entity, including a communications service of the entity. The obtained data records and the address book entry are formatted to provide an address book record for the entity in the address book. The address book record includes contact information for the entity and includes an identification of communications between the user and the entity and/or common appointments of the user and the entity.

9 Claims, 4 Drawing Sheets

OTHER PUBLICATIONS

"Good Contacts: Application Note-Sharing Outlook Folders," http://www.goodcontacts.com/support/apn_shared.htm, Copyright 2001-2004, 4 pages.

"Good Contacts Synchronizer Solution™," 2003, 2 pages.

"Installation and User's Guide, OfficeCalendar for Microsoft® Outlook™—Sharing Microsoft Outlook Calendar and Contacts without Exchange Server," Copyright 2003-2005, 53 pages.

* cited by examiner

METHODS FOR MANAGING AGGREGATED ADDRESS BOOKS

CROSS REFERENCE TO RELATED APPLICATION

This Application is related to and claims the priority of U.S. Provisional Patent Application Ser. No. 60/717,222, filed Sep. 15, 2005, entitled Systems and Methods for Managing Universal Address Book, the disclosure of which is hereby incorporated herein by reference.

BACKGROUND

The present invention generally relates to the field of communications services and, more particularly, to user databases for communications services.

A wide variety of means exist for communication between users. For example, a user may be contacted via a home phone, work phone, mobile phone etc. In addition, users may also communicate using devices such as PC's, PDA's, pagers, etc. using, for example, email and instant messaging.

Managing such a wide variety of communications for these devices can be difficult, such as, when a user changes location. For example, while traveling, it may only be possible to reach a user via the user's mobile phone. However, the user may best be reached by email while at work. Also, the user may wish to implement various rules for receiving and controlling communications. For example, to be reached at home, the user may want the home phone to ring three times before forwarding the call to a mobile phone. As another example, the user may wish to be paged each time an email is received from a particular person while away from the office, all of which may be unknown to those who wish to contact the user. Tracking people with their voicemails, emails, phone calls, appointments and the like may be difficult to organize, much less keep track of over time.

SUMMARY

Embodiments of the present invention include methods of managing data associated with an entity include providing an address book entry for the entity in an address book of a user. The address book entry has an associated name and includes a plurality of identifications associated with the entity. Data records associated with the entity are automatically obtained from a plurality of applications based on the plurality of identifications associated with the entity, including a communications service of the entity. The obtained data records and the address book entry are formatted to provide an address book record for the entity in the address book. The address book record includes contact information for the entity and includes an identification of communications between the user and the entity and/or common appointments of the user and the entity.

In other embodiments, the plurality of identifications includes a phone number associated with the communications service of the entity and the communications service of the entity has a plurality of selectable profiles for the phone number that correspond to a status of the entity. The profiles include settings for a plurality of features of the communications service including call forwarding, call waiting and/or voicemail. The obtained data records include the status of the entity. Formatting the obtained data records includes formatting the obtained data records to provide the address book record including an indication of the status of the entity.

In further embodiments, automatically obtaining data records includes obtaining data records from a plurality of applications. Electronic mail (email) associated with the entity may be obtained from an electronic mail application of the user to provide the identification of communications between the user and the entity. Incoming and/or outgoing phone calls associated with the entity may be obtained from a voice communications service application of the user to provide the identification of communications between the user and the entity. Voicemail messages associated with the entity may be obtained from the voice communications service application of the user to provide the identification of communications between the user and the entity. Text messages associated with the entity may be obtained from a data communications service application of the user to provide the identification of communications between the user and the entity. Calendar entries associated with the entity may be obtained from a calendar application of the user and/or a calendar application of the entity to provide the identification of common appointments. An identification of a current profile corresponding to a status of the entity may be obtained from a voice communications service application of the entity. Instant messaging (IM) data associated with the entity may be obtained from an IM application of the user and/or an IM application of the entity.

In other embodiments of the present invention, the plurality of identifications include a phone number associated with the communications service of the entity, an email address of the entity and/or an instant messaging identity of the entity. The plurality of identifications may include a password associated with the communications service of the entity and obtaining the identification of the current profile corresponding to the status of the entity may include obtaining the identification of the current profile using the password associated with communications service of the entity. Automatically obtaining data records may be preceded by obtaining authorization to obtain data records from the voice communications service application of the entity including the identification of the current profile.

In further embodiments of the present invention, providing an address book entry includes receiving the associated name and the plurality of identifications from the user and the method further includes displaying the address book record to the user. Displaying the address book record may include displaying the address book record responsive to a request from the user and automatically obtaining data records and formatting the obtained data records may be performed responsive to the request from the user to display the address book record. User preferences for the user may be provided and formatting the obtained data records may include formatting the obtained data records based on the user preferences. The user preferences may include at least one filter criterion and formatting the obtained data records may include selecting ones of the obtained data records to be displayed based on the at least one filter criterion. Ones of the data records may have an associated time and the at least one filter criterion may specify an earliest time and formatting the obtained data records may include deleting data records having an associated time before the earliest time.

In yet other embodiments of the present invention, automatically obtaining data records includes storing initial values of data records in an aggregated database and subscribing with the plurality of applications. Notifications of changes to the stored initial values of the data records are obtained from the subscribed to applications and the stored initial values are updated based on the notifications of changes. Formatting the obtained data records includes retrieving the data records from the aggregated database.

In further embodiments, automatically obtaining data records includes obtaining instant messaging (IM) data associated with the entity from an IM application of the user and/or an IM application of the entity. The obtained IM data includes a presence status of the entity. Displaying the address book record includes displaying an indication of the presence status of the entity along with data records obtained from at least one of the applications other than the IM application of the user and/or the IM application of the entity.

In other embodiments of the present invention, automatically obtaining data records includes obtaining an indication that the entity is currently participating in a phone call from the voice communications service application of the entity. Displaying the address book record includes displaying a notification that the entity is currently participating in a phone call along with data records obtained from at least one of the applications other than the voice communications service application of the entity.

In yet further embodiments of the present invention, aggregated address books include a plurality of address book records, each of which is associated with an entity. The address book records include data records associated with their respective entity including a plurality of identifications associated with the entity and a plurality of data records obtained from a plurality of applications based on respective ones of the plurality of identifications, including an identification of communications between the user and the entity and/or common appointments of the user and the entity.

In other embodiments of the present invention, computer systems for managing data associated with an entity include an aggregated database including a plurality of address book records, each of which is associated with an entity. The address book records include data records associated with their respective entity including a plurality of identifications associated with the entity and a plurality of data records obtained from a plurality of applications based on respective ones of the plurality of identifications, including an identification of communications between the user and the entity and/or common appointments of the user and the entity. A data record acquisition module is configured to obtain the data records from the applications based on the respective ones of the plurality of identifications. A presentation module is configured to format the obtained data records and to display the formatted data records to a user responsive to a request from the user. The applications may include a voice communications service of the entity having a plurality of selectable profiles for a phone number of the entity that correspond to a status of the entity and the presentation module may be configured to display an indication of the status of the entity based on a data record obtained by the data record acquisition module that indicates a current status of the entity.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF EMBODIMENTS OF THE INVENTION

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or flowchart illustrations of methods, apparatus, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
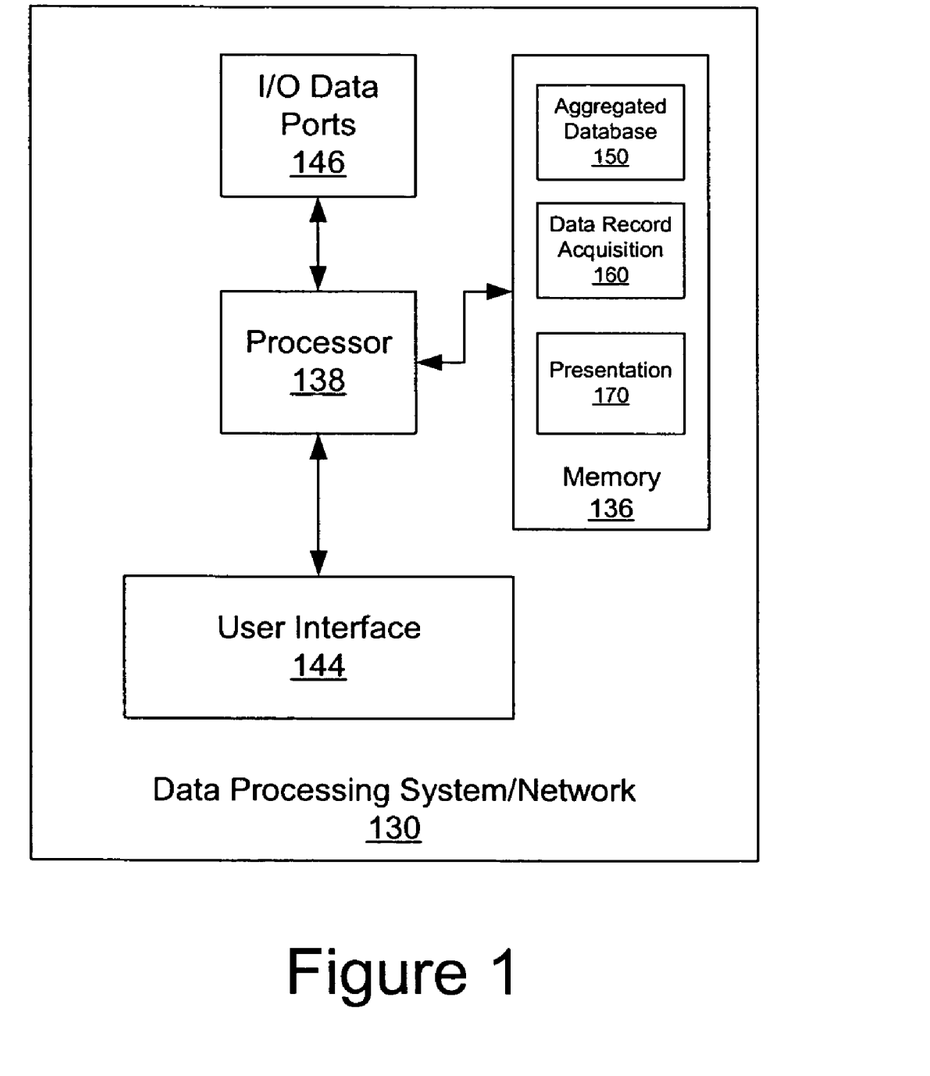
FIG. 1 is a block diagram of a data processing system suitable for use in some embodiments of the present invention.

Referring now to FIG. 1, an exemplary embodiment of devices, for example, an application server (AS) or the like or other data processing system 130 configured in accordance with some embodiments of the present invention will be discussed. The data processing system 130, which may be incorporated in, for example, a personal computer, a PDA, a wireless terminal/phone, or the like, may include a user interface 144, including, for example, input device(s) such as a keyboard or keypad, a display, a speaker and/or microphone, and a memory 136 that communicate with a processor 138. The data processing system 130 may further include an I/O data port(s) 146 that also communicates with the processor 138. The I/O data ports 146 can be used to transfer information between the data processing system 130 and another computer system or a network that may be associated with a communications service provider or user communication devices using, for example, an Internet Protocol (IP) connection. These components may be conventional components such as those used in many conventional data processing systems, which may be configured to operate as described herein.

As shown in the embodiments of FIG. 1, the memory 136 includes an aggregated database 150 providing an aggregated address book, a data record acquisition module 160 and a presentation module 170. While shown as resident in the memory 136 in the embodiments of FIG. 1 it will be understood that the respective database and module features, including the aggregated database 150, the data record acquisition module 160 and the presentation module 170, may be implemented, for example, as part of the operating system, as application programs, as components of a dynamic link library or the like of the data processing system 130 so as to be executed in whole or in part by the processor 138.

The aggregated database 150 includes a plurality of address book records, each of which is associated with an entity. For example, the entity may be an individual, an incorporated business and/or an association of a plurality of individuals. The address book records include data records associated with their respective entity, including a plurality of identifications associated with the entity and a plurality of data records obtained from different applications based on respective ones of the plurality of identifications. Thus, an address book record for an individual may include a wire line phone number of the individual at home and/or work, a mobile number, an electronic mail (email) address, an instant messaging (IM) identifier, a text message service identifier and/or a searchable name, text string or the like utilized in calendar entry references to the entity by the owner/user of the address book. The respective data records that may be obtained from the applications providing the corresponding services in some embodiments include identifications of communications between the user maintaining the address book and the entity and/or common appointments of the user and the entity.

The data record acquisition module 160 may be configured to obtain the data records from the respective applications based on respective ones of the plurality of identifications included in the address book entry for an entity in the aggregated database 150. The presentation module 170 may be configured to format the obtained data records from the aggregated database 150 and to display the formatted data records to a user responsive to a request from the user. An exemplary display of an address book record for a user is provided in FIG. 6 as will be further described later herein. In some embodiments of the present invention, for example, one of the applications providing data records is a voice communication service of the entity having a plurality of selectable profiles for a phone number of the entity that correspond to a status of the entity. For example, an individual may have a profile service provided in connection with a wire line phone number where the user may select a status condition such as "on vacation," "do not disturb," or the like, which will provide information regarding the status of the individual. In such embodiments, the presentation module 170 may be configured to display an indication of the status of the individual based on the data record obtained by the data record acquisition module 160 that indicates a current status of the individual. Accordingly, the data processing system 130 as described above may be configured to manage data associated with an entity maintained in an address book record of a user according to some embodiments of the present invention.

The aggregated database 150 alone or in combination with the data acquisition module 160 and/or presentation module 170 may provide an aggregated address book including a plurality of address book records. Each of the address book records is associated with an entity, such as an individual, business and/or associated group of individuals. The address book records may include data records associated with their respective entity including a plurality of identifications associated with the entity and a plurality of data records obtained from applications providing communications services or the like to the entity based on respective ones of the plurality of identifications.

The data records included in an address book record of the aggregated address book may include an identification of communications between the user and the entity and/or common appointments of the user and the entity. As will be described further herein, different user preferences or the like may be used in determining the criteria and the format for selection of information to include in an address book record and the presentation display format for those records to a user.

Computer implemented methods of managing data associated with address book entries for entities in an address book of a user will now be described with reference to the flowchart illustrations of FIGS. 2-5 and the schematic diagram of FIG. 6. For the embodiments illustrated in FIG. 2, operations for managing data associated with the entity begin by providing an address book entry for the entity in an address book of a user (block 200). The address book entry has an associated name and includes a plurality of identifications associated with the entity. The identifications may include names/addresses or the like for the entity and/or may include identification information for accessing and obtaining data records from anther application of the user, such as Outlook®, Quicken® and/or the like. In some embodiments, the address book entry may include additional information provided by the user. For example, the entity may be a service provider, such as a plumber, used by the user and the user may include a rating of the plumber and/or comments on the plumber as part of the address book entry information for the plumber that may subsequently be displayed as part of an address book record for the plumber.

Figure 2:
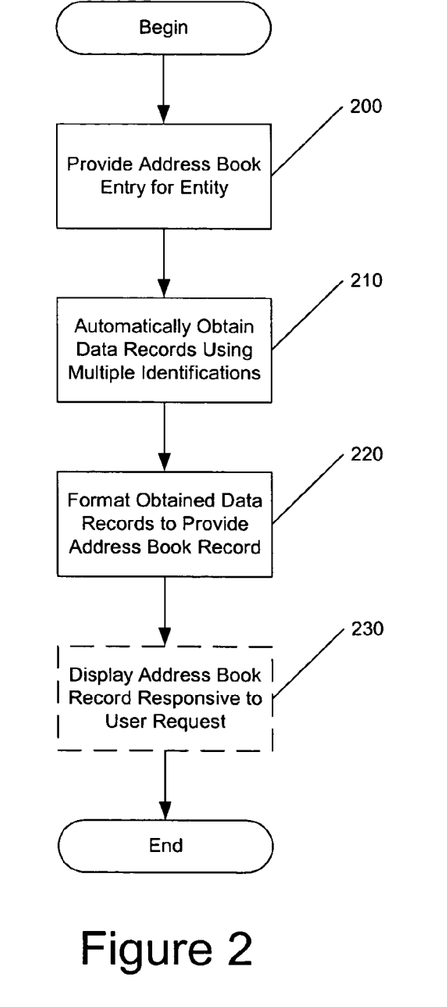
FIGS. 2-5 are flowcharts illustrating operations for managing data associated with an entity in an address book of a user according to some embodiments of the present invention.

Data records associated with the entity are automatically obtained from a plurality of applications based on the identifications associated with the entity provided in the address book entry (block 210). One of the applications or more may include a communications service of the entity, such as a wire line or mobile phone service. The other applications may further include an instant messaging (IM) application, an electronic mail (email) or other text messaging application, such as short message service (SMS) and/or multimedia message service (MMS). A calendar application of the user or the entity may also be one of the applications providing a source for data records. The corresponding identifications included in the provided address book entry at block 200 for accessing such applications may include, for example, a phone number associated with the communication, an email address of the entity and/or an instant messaging identity of the entity. Information included in the provided address book entry may further include an associated name for the entity and a plurality of identifications provided by the user, such as a mailing address, title, company name and/or the like for the entity.

In some embodiments, the entity may be a service provider or the like of the user, such as a credit card company of the user or a retailer used by the user. The identifications in the address book entry for the service provider entity may provide identifications allowing access to records associated with the user in connection with that service provider. For example, an identification may provide access and/or direction to another application, such as Quicken®, or independent source, such as a bank or the entity itself, from which payment records or charges/purchases of the user for that service provider entity may be obtained.

The obtained data records and the address book entry information from the user are formatted to provide an address book record for the entity in the address book (block 220). The address book record includes contact information for the entity and includes an identification of communications between the user and the entity and/or common appointments of the user and the entity and may include additional information as will be described herein. The address book record may be displayed to the user on request (block 230). Display may include use of pop-up windows, presentation of a contact data page, links to an external page (such as a web page), or the like.

Figure 3:
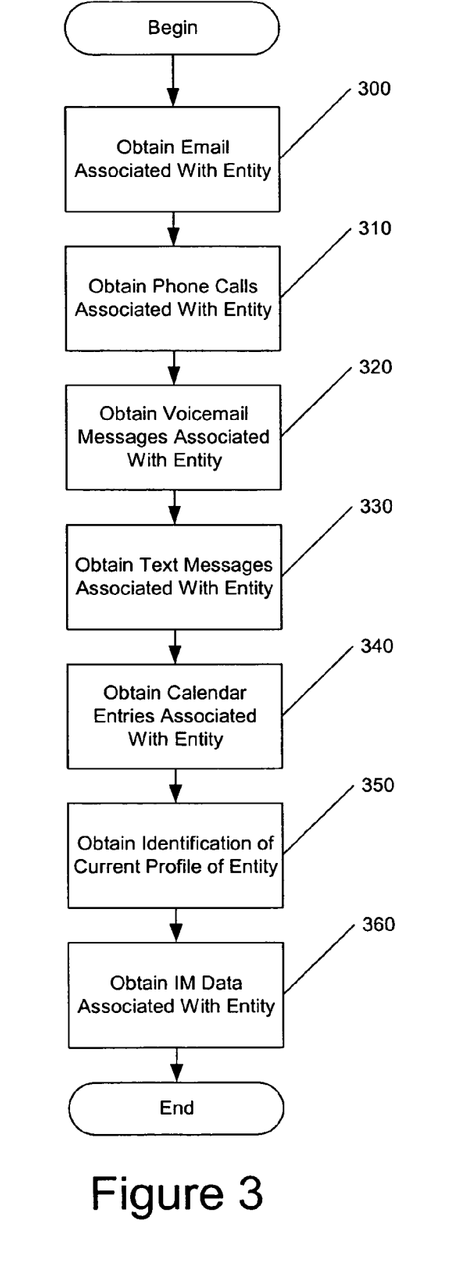

Operations for automatically obtaining various data records that may be provided in some embodiments of the present invention will now be described further with reference to the flowchart illustration of FIG. 3. As shown in FIG. 3, electronic mail (email) associated with an entity may be obtained from an electronic mail application of the user (or the entity) to provide an identification of email communications between the user and the entity (block 300). Incoming and/or outgoing phone calls associated with the entity may be obtained from a voice communication service application of the user to provide an identification of communications between the user and the entity (block 310).

Voice mail messages associated with the entity may be obtained from the voice communication service application of the user to provide an identification of additional communications between the user and the entity (block 320). Text messages associated with the entity may be obtained from a data communication service application of the user to provide an identification of text message communications between the user and the entity (block 330). Text messages may be SMS, MMS or other types of text messages. The data communication service application may be coordinated with or provided by a voice communication service application, such as a mobile communication service provider.

Calendar entries associated with an entity may be obtained from a calendar application of the user and/or a calendar application of the entity to provide an identification of common appointments of the user and the entity (block 340). Operations at block 340 may further include identification of approaching appointments regardless of whether they are common. For example, a user may wish to consider availability of an entity before attempting to contact the entity and knowledge of an impending appointment of the entity may be useful in determining when and/or how to best contact the entity.

An identification of a current profile corresponding to a status of the entity may be obtained from a voice communication service application of the entity (block 350). Instant messaging (IM) data associated with the entity may be obtained from an IM application of the user and/or an IM application of the entity (block 360).

One of the identifications associated with the entity in an address book entry may be a password associated with a phone number of a communication service of the entity. Obtaining an identification of a current profile corresponding to the status of the entity at block 350 may then include obtaining the identification of the current profile using the password associated with the phone number and the phone number linked to the profile. In some embodiments, automatically obtaining data records as described with reference to the various optional services that may be included in the aggregated address book my be preceded by obtaining authorization to obtain the data records, for example, from the voice communication service application of the entity. Such authorization security procedures to protect privacy may be provided for various of the respective applications providing data records, particularly where such applications are under the control of the entity rather than the user maintaining the aggregated address book. However, it will be understood that authorization and security procedures may be provided limiting access to the address book by the user to ensure that only authorized users have access to view and/or edit the aggregated address book itself.

With respect to the status information obtained through accessing a current profile at block 350, the communications service of the entity may have a plurality of selectable profiles for one or more phone numbers of the entity. The selectable profiles may respectively correspond to different status conditions for the entity and may further include settings for a plurality of features of the communications service. For example, selection of a different profile by the user, in addition to indicating a status of the user, may provide the communications service with criteria affecting call forwarding, call waiting and/or voice mail and the like services provided to the entity. Thus, the status information obtained from the identification of the current profile may be incidental information available in association with status based variations in services provided by the communications service application.

Current usage information for the associated information may also be associated with and provided by the communications service along with the profile indicating, for example, usage by the entity of the phone number. Thus, when viewing an address book record for the entity, a user may see a status indication showing that the entity is already busy on a phone conversation, which may lead the user to use email, text messaging or the like or to delay until a later time making an effort to contact the entity.

Further embodiments of the present invention will now be described with reference to the flowchart illustration of FIG. 4. As shown for the embodiments of FIG. 4, operations begin by providing user preferences for the user (block 400). User preferences may indicate, for example, the type of information desired to be included in an aggregated database record for the user, the time period over which the included data records extend, and formatting preferences for display of the various data records.

Figure 4:
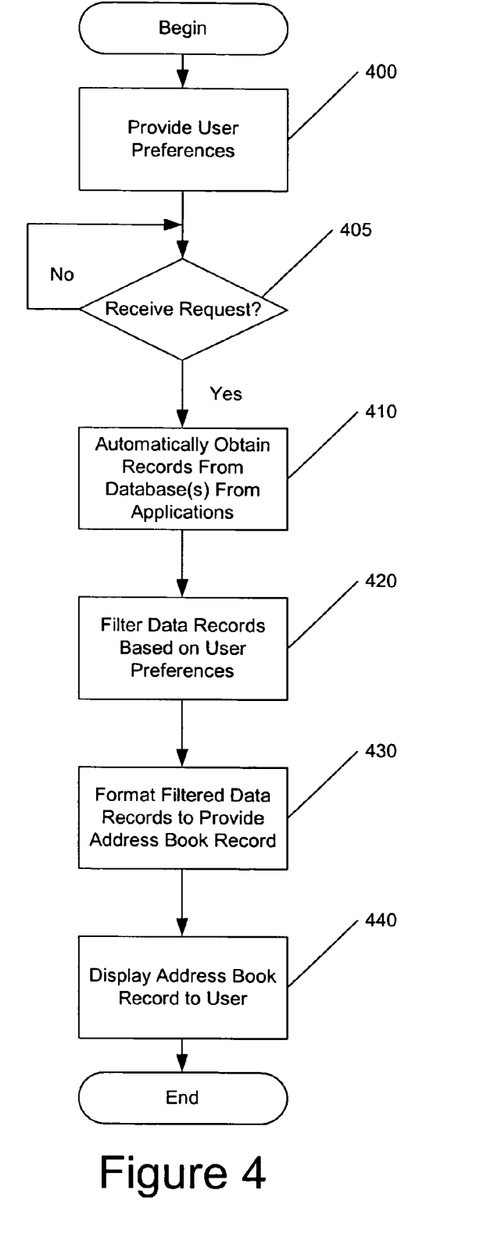

For the embodiments illustrated in FIG. 4, the aggregated address book for the user may not require or utilize an aggregated database maintaining all the relevant data records in a common location after accessing separate applications and their associated database records to built such an aggregated database. Accordingly, as shown in the embodiments of FIG. 4, when a request is received from a user to view or update an address book record in the aggregated address book of the user (block 405), the respective data records are automatically obtained from the various applications providing the data records utilizing the identifications for the entity included in the address book entry information provided by a user or otherwise (block 410). The data records obtained at block 410 are filtered using a filter criterion included in the user preferences provided at block 400 or otherwise (block 420). For example, if user preferences for filter criterion are not provided specific to the user, default values may be provided with the application providing the aggregated address book. The filter criterion may, for example, specify an earliest time of interest for a data record and one or more of the data records may have an associated time and may be compared to the filter criterion earliest time in filtering the data records at block 420.

The filtered data records are formatted to provide an address book record for an entity (block 430). The address book record may then be displayed to the user (block 440) responsive to the request received at block 405. Accordingly, information to build the address book record for an entity requested by the user at block 405 may be obtained at the time of receipt of the request by queries to devices and applications of the user and/or entity that maintain data records that will be utilized in generating the address book record displayed to the user at block 440. However, it will be understood that an aggregated database might also be maintained so as to provide potentially faster response to the request received from the user at block 405.

Figure 5:
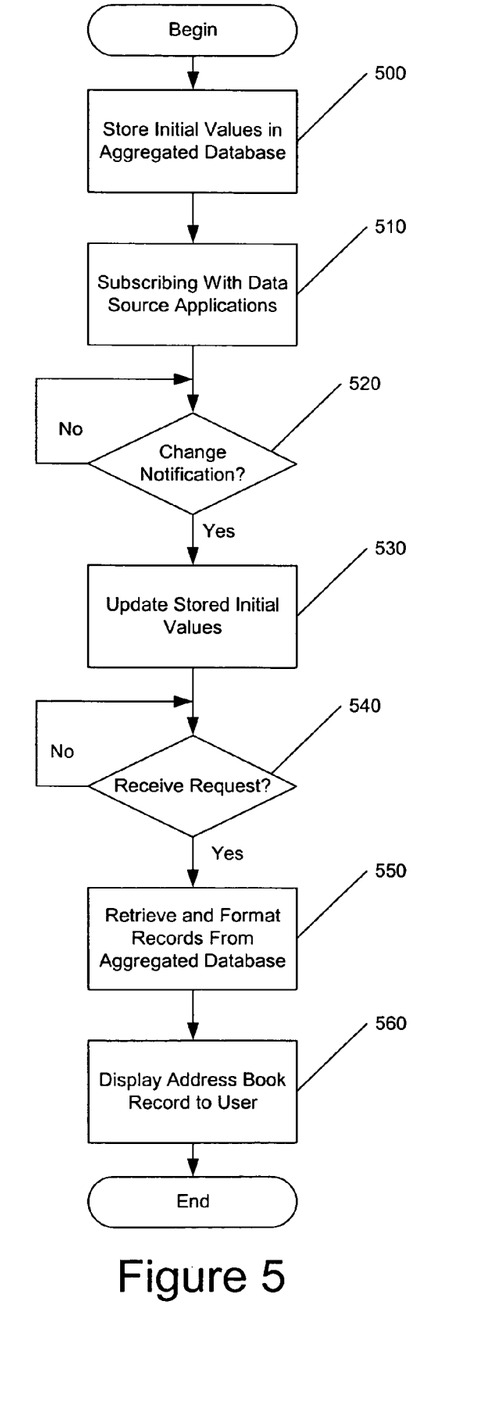

Further embodiments of the present invention will now be described with reference to the flowchart illustration of FIG. 5. As illustrated in the embodiments of FIG. 5, operations begin by storing initial values of data records associated with an address book in an aggregated database (block 500). A user maintaining the address book subscribes with a plurality of different applications that will be providing data records that will be used in generating an address book record in the address book for the user (block 510). Based on the subscriptions, the respective applications may provide notifications of when the initial values for the data records that have been stored in the aggregated database have changed (block 520).

On obtaining a notification of a change to a stored initial value of a data record from the subscribed to application (block 520), the stored initial values are updated in the aggregated database based on the change notification information (block 530). Operations illustrated for the embodiments of FIG. 5 further include, responsive to receiving a request for display or update of an address book record in the aggregated address book (block 540), retrieving and formatting the records from the aggregated database (block 550). The address book record is displayed to a user (block 560).

In some embodiments of the present invention, automatically obtaining data records may include obtaining instant messaging (IM) data associated with an entity for an IM application of the user and/or an IM application of the entity. The obtained IM data may include a present status of the entity and an indication of that present status may be displayed to a user with the address book record displayed at block 560 along with data records information obtained from applications other than the IM application of the user and/or entity. In other embodiments, the obtained data records may include obtaining an indication that the entity is currently participating in a phone call, which information may be provided by the voice communication service application of the entity as discussed above. The displayed address book record at block 560 may then include notification that the entity is currently participating in a phone call along with displaying data record information obtained from other applications than the voice communication service application of the entity.

Figure 6:
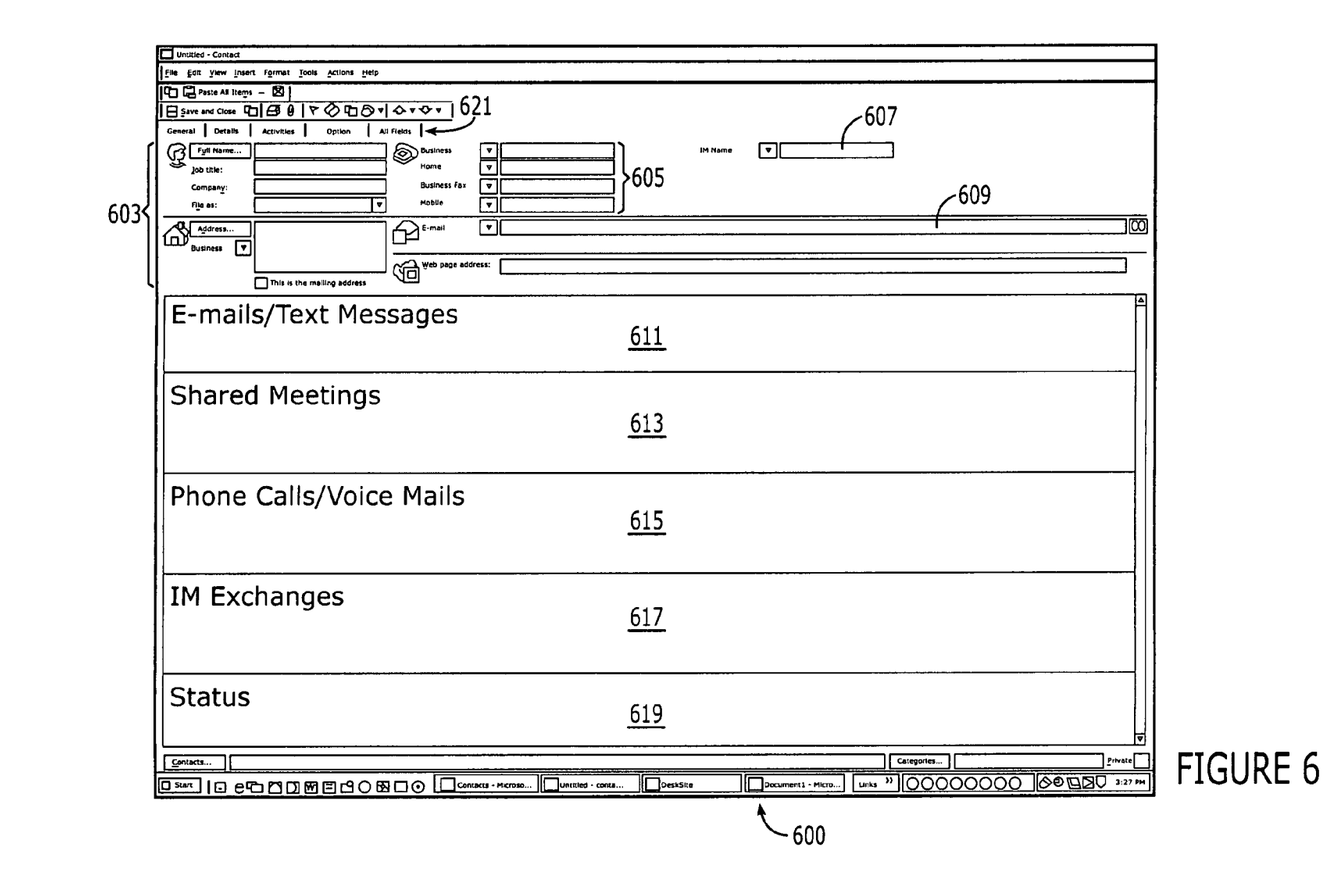
FIG. 6 is a schematic diagram illustrating a display of an address book record of an aggregated address book of a user according to some embodiments of the present invention.

An example of a displayed address book record is illustrated in the schematic diagram of FIG. 6. As shown in the display of FIG. 6, the address book record 600 includes address book entry fields 603, such as "Full Name," "Job Title," "Company," and "File as" for the entity as well as an "Address" input field. Identifications associated with the entity for voice communication services are provided in the identification field 605, such as a business, home, and mobile phone number and business fax. An IM identification for the user is included as an IM name 607. An email address 609 may also be provided as one of a plurality of identifications provided for the entity. The address book entry field information may be provided through manual entry by a user or from another source, such as a download from other databases maintained and/or otherwise accessible to a user in creating the address book entry portion including identifications of the address book record for the aggregated address book of the user.

In addition to the address book entry fields 603, 605, 607, 609, display fields for data record information obtained from various applications are also shown in the illustrative address book record 600. These additional fields include an Emails/Text Messages field 611, a Shared Meetings field 613, a Phone Calls/Voicemails field 615, an IM Exchanges field 617 and a status field 619. Exchanged emails, SMS and/or MMS messages between the entity associated with the address book record 600 and the user over a time period specified by the user may be listed in the Emails/Text Messages field 611. Meetings on the user's calendar maintained by the user's calendar application where the entity associated with the address book record 600 will also be in attendance may be listed in the Shared Meetings field 613. Phone calls to and/or from the user and/or voice mails from the user over a period of time specified by the user may be included in the Phone Calls/Voicemails field 615. IM communications between the user and the entity associated with the address book record 600 may be displayed in the IM Exchanges field 617. Status information regarding the entity associated with the address book record 600 may be displayed in the Status field 619. For example, if the entity is currently engaged in a phone call and/or has selected a vacation, do not disturb, or the like named profile and this information is provided by the voice communications service application of the entity, such status information may be displayed to a user in the Status field 619.

Additional information or formats for breaking out the listings in an organized fashion may be utilized with various embodiments of the present invention and may further be modified based on user specific preferences provided to the application generating the address book record 600 for display to a user. In addition, alternative and/or additional information displays may be selected by selecting a different one of the tabs 621. Accordingly, it will be understood that the particular format and information included in the address book record 600 are provided for illustrative purposes and the present invention is not limited to the particular information included in or format of presentation of that information shown in the embodiments of FIG. 6.

The plurality of communications services providing data in some embodiments may include wire line phone service, cellular phone service and/or electronic mail (e-mail) service. It will be understood that, as used herein, electronic mail or e-mail refers to text based communications services and may include text based services such as multimedia message service (MMS) and/or short message service (SMS) or like services that may be provided, for example by a cellular phone service provider, as well as IP address based e-mail.

In some embodiments of the present invention as described above, by creating a Universal Address Book (UAB) that aggregates all the desired contact information (appointments, call logs, voice mails, emails, profile, etc.) regarding a particular UAB entry, this information may be made more useful for a user. For instance, when selecting an entry in a UAB for "John Smith," the user may be shown conventional address book entry information, such as John's name, address, phone numbers, email and the like, but also be shown John's recent emails, voice mails, phone calls exchanged with the user as well as their common appointments and the like. The user could also see status information, such as an indication that John was on vacation or in the office or does not wish to be disturbed according to John's current profile. In this way, a more informative contact presentation or summary can be presented to the user, which may provide a more complete representation of the overall relationship between the user and the entity associated with the UAB entry.

It will be understood that at least a portion of the communications described herein can be provided according to Session Initiation Protocol (SIP), which is described in more detail in, for example, "Internet Communications Using SIP," by Henry Sinnreich, ISBN: 0-471-41399-2. Internet Protocol communications are generally described in, for example, "TCP/IP Protocol Suite," by Behrouz A Forouzan, ISBN: 0-07-119962-4. Moreover, techniques for the creation and operation of virtual communities, is described in, for example, "Design for Community: The Art of Connecting Real People in Virtual Places," by Derek M. Powazek, ISBN: 0-7357-1075-9. The content these references is incorporated herein by reference.

The communications used for messages may be provided using an Internet Protocol (IP) Multimedia Subsystem (IMS). IMS can utilize a packet switched domain (such as the Internet) to transport multimedia signaling and bearer traffic. The message forwarding may be provided, for example, via a Universal Mobile Telecommunication System (UMTS) to access multimedia services of IMS. IP Multimedia Systems are discussed in each of the following: (1) 3GPP TS 22.228 entitled "Service Requirements for the IP Multimedia Core Network Subsystems"; (2) 3GPP TS 23.228 entitled "IP Multimedia Subsystems"; and (3) 3GPP TR 22.941 entitled "IP Based Multimedia Services Framework." The subject matter of each of these references is hereby incorporated by reference.

It will be understood that messages can be provided via a TCP/IP Session Initiation Protocol (SIP) message, a SS7 (Signaling System 7) message, a common channel SS7 message, an in-band signaling message, and/or a Short Message Service (SMS) message, an Enhanced Message Service (EMS) message, a Multimedia Message Service (MMS) message, and/or Smartmessaging™ message. As is known to those skilled in the art, SMS and EMS messages can be transmitted on digital networks, such as GSM networks, allowing relatively small text messages (for example, 160 characters in size) to be sent and received via a network operator's message center to the user device, or via the Internet, using a so-called SMS (or EMS) "gateway."

In the drawings and specification, there have been disclosed embodiments of the invention and, although specific terms are employed, they are used in a generic and descriptive sense only and not for purposes of limitation, the scope of the invention being set forth in the following claims.

What is claimed:

1. A computer implemented method of managing data associated with an entity, comprising:

providing an address book entry for the entity in an address book of a user, the address book entry having an associated name and including a plurality of identifications associated with the entity;

automatically selectively obtaining data records associated with the entity from a plurality of applications based on the plurality of identifications associated with the entity, at least one of the applications including a communications service of the entity; and formatting the obtained data records and the address book entry to provide an address book record for the entity in the address book, the address book record including contact information for the entity and including, based on the selectively obtained data records, an identification of communications exchanged between the user and the entity and common appointments of the user and the entity, wherein automatically selectively obtaining data records includes a plurality of the following:

obtaining electronic mail associated with the entity from an electronic mail application of the user to provide the identification of communications between the user and the entity;

obtaining incoming and outgoing phone calls associated with the entity from a voice communications service application of the user to provide the identification of communications between the user and the entity;

obtaining voicemail messages associated with the entity from the voice communications service application of the user to provide the identification of communications between the user and the entity;

obtaining text messages associated with the entity from a data communications service application of the user to provide the identification of communications between the user and the entity;

obtaining calendar entries associated with the entity from a calendar application of the user and a calendar application of the entity to provide the identification of common appointments;

obtaining an identification of a current profile corresponding to a status of the entity from a voice communications service application of the entity; and obtaining instant messaging data associated with the entity from an instant messaging application of the user and an instant messaging application of the entity, wherein the plurality of identifications comprise a phone number associated with the communications service of the entity, an electronic mail address of the entity and an instant messaging identity of the entity;

wherein providing an address book entry includes receiving the associated name and the plurality of identifications from the user and wherein the method further comprises displaying the address book record to the user;

wherein the user preferences include at least one filter criterion and wherein formatting the obtained data records including selecting ones of the obtained data records to be displayed based on the at least one filter criterion;

wherein ones of the data records have an associated time and wherein the at least one filter criterion specifies an earliest time and wherein formatting the obtained data records includes deleting data records having an associated time before the earliest time.

2. The method of claim 1, wherein the plurality of identifications includes the phone number associated with the communications service of the entity and wherein the communications service of the entity has a plurality of selectable profiles for the phone number that correspond to the status of the entity, the profiles including settings for a plurality of features of the communications service including call forwarding, call waiting and voicemail, and wherein the obtained data records include the status of the entity and wherein formatting the obtained data records includes formatting the obtained data records to provide the address book record including an indication of the status of the entity.

3. The method of claim 1, wherein the plurality of identifications includes a password associated with the communications service of the entity and wherein obtaining the identification of the current profile corresponding to the status of the entity comprises obtaining the identification of the current profile using the password associated with the communications service of the entity.

4. The method of claim 1, wherein automatically selectively obtaining data records is preceded by obtaining authorization to obtain data records from the voice communications service application of the entity including the identification of the current profile.

5. The method of claim 1, wherein displaying the address book record comprises displaying the address book record responsive to a request from the user and wherein automatically selectively obtaining data records and formatting the obtained data records are performed responsive to the request from the user to display the address book record.

6. The method of claim 1, further comprising providing user preferences for the user and wherein formatting the obtained data records comprises formatting the obtained data records based on the user preferences.

7. The method of claim 1, wherein automatically selectively obtaining data records comprises:
storing initial values of data records in an aggregated database;
subscribing with the plurality of applications;
obtaining notifications of changes to the stored initial values of the data records from the subscribed to applications; and
updating the stored initial values based on the notifications of changes;
wherein formatting the obtained data records comprises retrieving the data records from the aggregated database.

8. The method of claim 1, wherein automatically selectively obtaining data records includes obtaining instant messaging (IM) data associated with the entity from an instant messaging application of the user and an instant messaging application of the entity and wherein the obtained instant messaging data includes a presence status of the entity and wherein displaying the address book record includes displaying an indication of the presence status of the entity along with data records obtained from at least one of the applications other than the instant messaging application of the user and the instant messaging application of the entity.

9. The method of claim 1, wherein automatically selectively obtaining data records includes obtaining an indication that the entity is currently participating in a phone call from the voice communications service application of the entity and wherein displaying the address book record includes displaying a notification that the entity is currently participating in a phone call along with data records obtained from at least one of the applications other than the voice communications service application of the entity.

* * * * *